United States Patent
Han et al.

(10) Patent No.: US 9,417,362 B2
(45) Date of Patent: Aug. 16, 2016

(54) REFLECTIVE STRUCTURE AND DISPLAY APPARATUS EMPLOYING THE SAME

(75) Inventors: Moon-Gyu Han, Yongin-si (KR); Yong-Wan Jin, Seoul (KR); Jung H. Shin, Daejeon (KR); Kyung-Jae Chung, Daejeon (KR)

(73) Assignees: SAMSUNG ELECTRONICS CO., LTD., Gyeonggi-Do (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 13/342,591

(22) Filed: Jan. 3, 2012

(65) Prior Publication Data
US 2012/0169978 A1 Jul. 5, 2012

(30) Foreign Application Priority Data
Dec. 31, 2010 (KR) .................. 10-2010-0140679

(51) Int. Cl.
| | | |
|---|---|---|
| G02F 1/1335 | (2006.01) | |
| G02B 5/128 | (2006.01) | |
| G02B 3/00 | (2006.01) | |
| G02B 5/26 | (2006.01) | |
| G02B 5/22 | (2006.01) | |

(52) U.S. Cl.
CPC ............... *G02B 3/005* (2013.01); *G02B 5/128* (2013.01); *G02B 5/223* (2013.01); *G02B 5/26* (2013.01); *G02F 1/133553* (2013.01)

(58) Field of Classification Search
USPC .......... 349/113–114; 359/850–861, 868, 869; 362/623, 609
See application file for complete search history.

(56) References Cited

U.S. PATENT DOCUMENTS

| | | | | |
|---|---|---|---|---|
| 4,185,894 A | * | 1/1980 | Hilton et al. | 349/114 |
| 5,272,554 A | * | 12/1993 | Ji et al. | 349/27 |
| 5,583,676 A | * | 12/1996 | Akiyama et al. | 349/28 |
| 5,939,201 A | * | 8/1999 | Boire et al. | 428/432 |
| 6,051,513 A | | 4/2000 | Kumazawa et al. | |

(Continued)

FOREIGN PATENT DOCUMENTS

| | | |
|---|---|---|
| JP | 10-312027 A | 11/1998 |
| JP | 2001-074919 A | 3/2001 |

(Continued)

OTHER PUBLICATIONS

Korean Office Action dated Jan. 13, 2016 for corresponding KR Application No. 10-2010-0140679.

*Primary Examiner* — Michael Caley
*Assistant Examiner* — Jia Pan
(74) *Attorney, Agent, or Firm* — Harness, Dickey & Pierce, P.L.C.

(57) ABSTRACT

According to example embodiments, a reflective film includes a plurality of first concave-convex elements having a curved surface and a plurality of second concave-convex elements on the curved surface. The second concave-convex elements may be a smaller scale than a scale of the plurality of first concave-convex elements. The reflective structure may further include a color purity control element configured to reduce degradation of a color purity expressed by the reflective film. The color purity control element may be configured such that at least a complementary light with respect to a color light reflected by the reflective film travels in the same direction as the reflected color light.

6 Claims, 10 Drawing Sheets
(4 of 10 Drawing Sheet(s) Filed in Color)

(56) References Cited

U.S. PATENT DOCUMENTS

| | | | |
|---|---|---|---|
| 6,317,179 B1* | 11/2001 | Kamiya | 349/78 |
| 6,476,890 B1* | 11/2002 | Funahata et al. | 349/113 |
| 6,654,083 B1* | 11/2003 | Toda et al. | 349/110 |
| 6,741,307 B2* | 5/2004 | Matsunaga et al. | 349/112 |
| 2006/0003156 A1 | 1/2006 | Masutani et al. | |
| 2009/0237800 A1 | 9/2009 | Nakamura et al. | |
| 2010/0104810 A1 | 4/2010 | Fukazawa et al. | |
| 2010/0177393 A1* | 7/2010 | Lee et al. | 359/584 |
| 2011/0235182 A1* | 9/2011 | Han et al. | 359/585 |

FOREIGN PATENT DOCUMENTS

| | | |
|---|---|---|
| JP | 2009-009650 A | 1/2009 |
| JP | 2010-060974 A | 3/2010 |
| KR | 10-2006-0048512 A | 5/2006 |

* cited by examiner

US 9,417,362 B2

REFLECTIVE STRUCTURE AND DISPLAY APPARATUS EMPLOYING THE SAME

CROSS-REFERENCE TO RELATED APPLICATIONS

This application claims priority under 35 U.S.C. §119 to the benefit of Korean Patent Application No. 10-2010-0140679, filed on Dec. 31, 2010, in the Korean Intellectual Property Office, the contents of which is incorporated herein in its entirety by reference.

BACKGROUND

1. Field

Example embodiments relate to a reflective structure and a display apparatus employing the same, and more particularly, to a reflective structure designed to improve color purity, and a display apparatus employing the same.

2. Description of the Related Art

Generally, pigment is used to implement colors. In order to control chromaticity in a color implementation scheme using pigment, a color implementation scheme using reflection and interference of light, a so-called structural color scheme, has been proposed. In a color implementation scheme using reflection and interference of light, efficiency is determined according to a reflective ratio of a reflector, thus allowing color implementation of high efficiency. In addition, chromaticity is determined according to the wavelength of reflected light, thereby facilitating control of chromaticity.

However, in the structural color scheme, which implements colors by using reflection and interference of light, an expressed color may change according to an angle of light incident to a reflector, that is, an incident angle, and a viewing angle. As a result, a multi-coloration phenomenon may occur. A color may look bright or dark at a particular angle due to constructive interference or destructive interference of diffracted light.

SUMMARY

Example embodiments relate to a reflective structure and a display apparatus employing the same.

Additional aspects will be set forth in part in the description which follows and, in part, will be apparent from the description, or may be learned by practice of example embodiments.

According to example embodiments, a reflective structure includes a reflective film. The reflective film may include a plurality of first concave-convex elements having a curved surface, and a plurality of second concave-convex elements on the curved surface. The second concave-convex elements may be a smaller scale than a scale of the plurality of first concave-convex elements. The reflective structure may further include a color purity control element configured to reduce degradation of a color purity expressed by the reflective film. The color purity control element may be configured such that at least a complementary light with respect to a color light reflected by the reflective layer travels in the same direction as the reflected color light.

The color purity control element may include an absorption layer. The absorption layer may be on a bottom surface of the reflective film.

The absorption layer may include a gray absorber that includes one of a pigment, carbon, and a chrome.

The color purity control element may include a reflective layer on a bottom surface of the reflective film.

Thee reflective layer may include a metal.

The reflective layer may include one of aluminum and barium sulfate.

The color purity control element may include a complementary-color absorption layer. The complementary-color absorption layer may be in the reflective film.

The reflective film may include the complementary-color absorption layer and a different layer. The complementary-color absorption layer and the different layer may be repetitively stacked in turns. The different layer may include a different material than a material of the complementary-color absorption layer.

The reflective film may be composed of a silicon oxide layer and a silicon layer. The silicon oxide layer and the silicon layer may be repetitively stacked in turns. The silicon layer may be the complementary-color absorption layer.

The color purity control element may be distributed in the reflective film. The color purity control element may include one of a pigment and a dye.

The reflective structure may include a plurality of nanoparticles. The reflective film may be on the plurality of nanoparticles.

The reflective film may include a structure where a first layer and a second layer are stacked in turns.

According to example embodiments, a display apparatus includes a reflective structure having various characteristics described above.

According to example embodiments, an omni-directional reflective structure having no color change (and/or substantially no color change) according to a viewing angle and capable of improving color purity, and a display apparatus including the reflective structure are provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects of example embodiments will become apparent and more readily appreciated from the following description of the non-limiting embodiments, as illustrated in the accompanying drawings in which like reference characters refer to the same parts throughout the different views. The drawings are not necessarily to scale, emphasis instead being placed upon illustrating the principles of inventive concepts. In the drawings.

DETAILED DESCRIPTION

Figure 1:
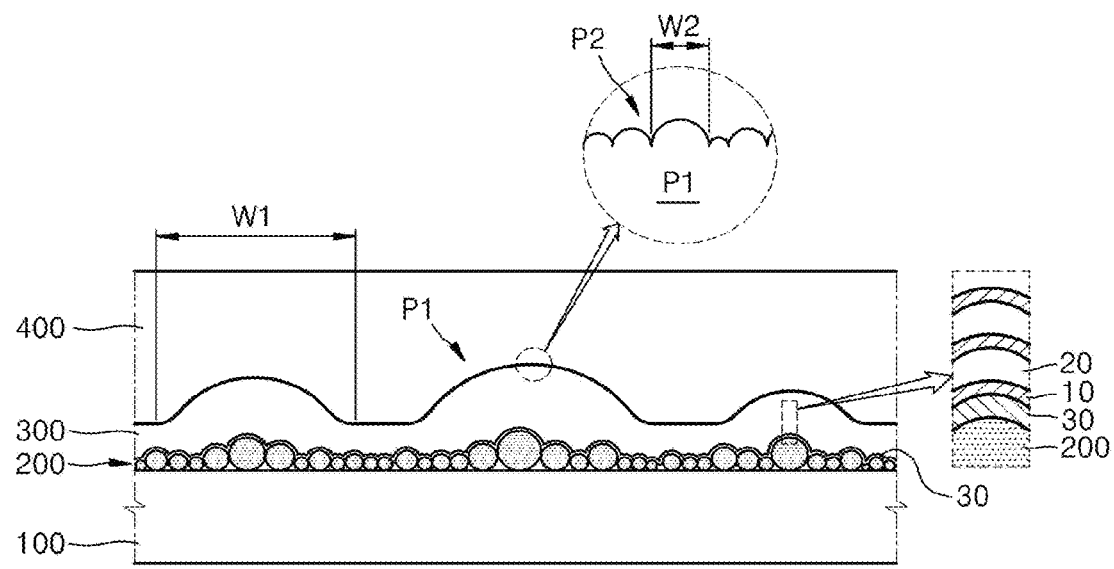
FIG. 1 is a schematic diagram of a reflective structure according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey concepts of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic diagram of a reflective structure according to example embodiments.

Referring to FIG. 1, the reflective structure may include a reflective film 300 and a color purity control element. The reflective film 300 may include a plurality of first concave-convex elements P1 forming a curved surface and a plurality of second concave-convex elements P2 formed on the curved surface at a smaller scale than the plurality of first concave-convex elements P1. The plurality of first concave-convex elements P1 may have a micro scale. For example, a width W1 of each of the plurality of first concave-convex elements P1 (hereinafter, referred to as a first width) may be about several tens of μm through about several hundreds of μm. A height of each first concave-convex element P1 may be larger than about several tens of μm. At least some of the plurality of first concave-convex elements P1 may have a wrinkled shape. The plurality of first concave-convex elements P1 may have non-uniform sizes. Thus, the surface of the reflective film 300 may have a micro-scale curve.

Referring to a partial enlargement marked with a dashed circle in FIG. 1, the surface of the plurality of first concave-convex elements P1 may include the plurality of second concave-convex elements P2 having smaller sizes than the plurality of first concave-convex elements P1. The plurality of second concave-convex elements P2 may have a nanoscale. For example, a width W2 (hereinafter referred to as a second width of each of the plurality of second concave-convex elements P2 may be about several tens of nm through about several hundreds of nm. The plurality of second concave-convex elements P2 each may be a hemispheric shape or a shape similar thereto, and may have non-uniform sizes. The plurality of second concave-convex elements P2 may be provided over the entire top surface of the reflective film 300.

Herein, a structure where small concave-convex portions (that is, the second concave-convex elements P2) are formed on large concave-convex portions (that is, the first concave-convex elements P1) as described above will be referred to as a multi-concave-convex structure.

Referring to a partial enlargement marked with a dashed square, the reflective film 300 may have a multi-layer structure where a first layer 10 and a second layer 20 are repetitively stacked in turns. The first layer 10 and the second layer 20 may have different refractive indices. Because of the different refractive indices of the first layer 10 and the second layer 20, reflection of light may occur at an interface between the first layer 10 and the second layer 20. By controlling materials and thicknesses of the first layer 10 and the second layer 20, the wavelength of reflected light may change. Therefore, a color expressed by the reflective film 300 may change according to the materials and thicknesses of the first layer 10 and the second layer 20. For example, according to the thicknesses and materials of the first layer 10 and the second layer 20, various reflection spectrums such as red (R), green (G), blue (B), and so forth can be obtained.

One of the first layer 10 and the second layer 20 may be a non-dielectric layer and the other may be a dielectric layer. The non-dielectric layer may be a metal layer. For example, the first layer 10 may be a metal layer and the second layer 20 may be a dielectric layer. Thus, the reflective film 300 may have a structure where the metal layer and the dielectric layer are repetitively stacked in turns. When the first layer 10 is a metal layer, the first layer 10 may be formed of transition metal, for example, Cr, Ni, Co, etc. However, the first layer 10 may also be formed of metal other than transition metal. When the first layer 10 is a metal layer, the metal layer may be relatively thin in order to reduce (and/or substantially minimize) the absorption of light thereby. For example, the first layer 10 may be formed to have a thickness less than about 50 nm, and/or less than about 20 nm. When the second layer 20 is a dielectric layer, the second layer 20 may be formed of, for example, $SiO_2$, $TiO_2$, $CaF_2$, LiF, $MgF_2$, or the like, but a material forming the second layer 20 may be others variously. The second layer 20 may have an optical thickness corresponding to $\lambda/2$, where $\lambda$ is a center wavelength of light to be reflected. When the second layer 20 has an optical thickness corresponding to $\lambda/2$, constructive interference between diffracted lights may occur.

In example embodiments, the first layer 10 and the second layer 20 may be different dielectric layers, respectively. In other words, the reflective film 300 may have a structure where a first dielectric layer as the first layer 10 and a second dielectric layer as the second layer 20 are repetitively stacked in turns. Also in this case, reflection of light having a particular wavelength may occur at the interface between the first layer 10 and the second layer 20. Each of the first layer 10 and the second layer 20 may be formed of, for example, $SiO_2$, $TiO_2$, $CaF_2$, LiF, $MgF_2$, or the like, but a material forming each of the first layer 10 and the second layer 20 may be others variously.

For example, the first layer 10 and the second layer 20 may be formed of, for example, $TiO_2/SiO_2$ thin films.

On the reflective film 300, the plurality of second concave-convex elements P2 having a nano scale are relatively finely arranged in random heights over the entire (or substantially entire) top surface of the reflective film 300, such that reflection, diffraction, and scattering of light by each of the plurality of second concave-convex elements P2 may occur. The reflective film 300 may have an omni-directional reflection property in which no color change occurs (or substantially no color change occurs) according to a viewing angle. On the reflective film 300, the plurality of second concave-convex elements P2 may be formed along the curved surface formed by the plurality of first concave-convex elements P1 having a micro scale. That is, the surface of the reflective film 300 where the plurality of nano-scale second concave-convex elements P2 are formed has a curved shape due to the plurality of first concave-convex elements P1 having a micro-scale.

As such, when the plurality of nano-scale second concave-convex elements P2 having a nano-scale are formed along the micro-scale curved surface, that is, the curved surface formed by the plurality of first concave-convex elements P1, they may express a bright color at any angle (observation angle) without reflecting light like a mirror. This may be because the surface of the reflective film 300 has a randomly rough shape at a macroscopic level. Since the surface of the reflective film 300 includes nano-scale concave-convex elements (the plurality of second concave-convex elements P2), reflection, diffraction, and scattering of light occur by each of the concave-convex elements, thus providing an omni-directional reflection property having no color change (or substantially no color change) according to a viewing angle. Therefore, the reflective film 300 according to example embodiments has no color change (or substantially no color change) according to a viewing angle and expresses a bright color when viewed from any angle because of high reflection ratio in any direction (at any observation angle). Hence, the reflective film 300 may twinkle and express a bright color at any angle (observation angle) even in a non-specular illumination condition.

Herein, on the reflective film 300, the plurality of second concave-convex elements P2 may not be formed along the curved surface formed by the plurality of first concave-convex elements P1, and rather may be two-dimensionally arranged along a flat surface. That is, the reflective film 300 may have the plurality of second concave-convex elements P2 without the plurality of first concave-convex elements P1, and in this case, the reflective film 300 may express a bright color only in a specular illumination condition.

To achieve high color purity in structure color-based color formation, the reflective film 300 may be manufactured to have a plurality of interlayered reflective films, that is, a multi-layer structure where the first layer 10 and the second layer 20 are repetitively stacked in turns, and the interlayered thin films are transparent to a complementary color with respect to the expressed structure color. As a result, when light is incident from a rear surface of the reflective structure or light incident from a front surface of the reflective structure is reflected back to the reflective film 300, the complementary color with respect to the structure color passes through the interlayered thin film structure, resulting in degradation of color purity.

The color purity control element is intended to reduce reflection and transmission of unwanted colors while maintaining a structure color to be achieved by the reflective film 300. The color purity control element is provided such that at least complementary light with respect to color light reflected by the reflective film 300 travels in the same direction as the color light reflected by the reflective film 300, thereby reducing degradation of color purity.

According to example embodiments, the color purity control element may be an absorption layer 30 disposed on a bottom surface of the reflective film 300. The reflective structure may include a plurality of nano-particles 200 on the substrate 100 to allow the reflective film 300 to have the plurality of second concave-convex elements P2, and may include the reflective film 300 formed on the plurality of nano-particles 200. In this case, the absorption layer 30 may be formed on the plurality of nano-particles 200 and the reflective film 300 may be formed on the absorption layer 30.

The absorption layer 30 may be formed to include a gray absorber formed of one of, for example, a pigment, carbon, Cr, and so forth.

Through the absorption layer 30, incidence of light from the rear surface of the reflective structure can be prevented or reduced and reflection of light incident from the front surface of the reflective structure back to the reflective film 300 can be prevented and/or reduced. In this way, color purity to be expressed by the reflective film 300 can be improved, thus allowing high-quality color implementation even in application to a reflective display apparatus to which a bright white light is incident.

For example, in comparison to omission of the absorption layer 30, the reflective structure having high color purity can be obtained when the absorption layer 30 is formed using Cr, as will be described below through comparison.

Figure 2A:
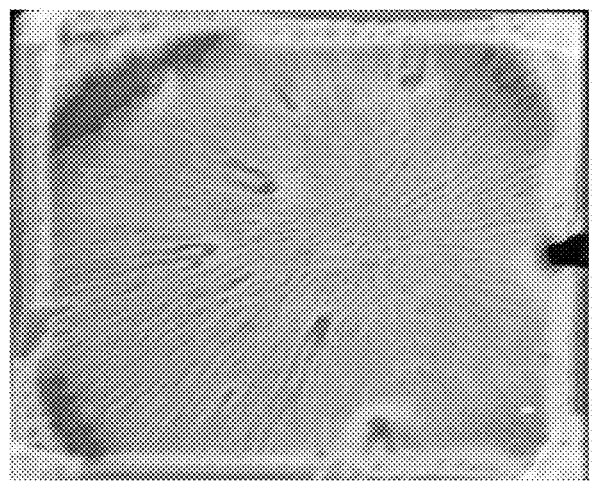
FIGS. 2A through 2D show pictures of a $TiO_2/SiO_2$ interlayered thin film manufactured such that the $TiO_2/SiO_2$ interlayered thin film is disposed immediately on a substrate coated with silica balls without an absorption layer between the interlayered thin film and the substrate to reflect blue (FIG. 2A), red (FIGS. 2B and 2C), and yellow through green (FIG. 2D)
Figure 2B:
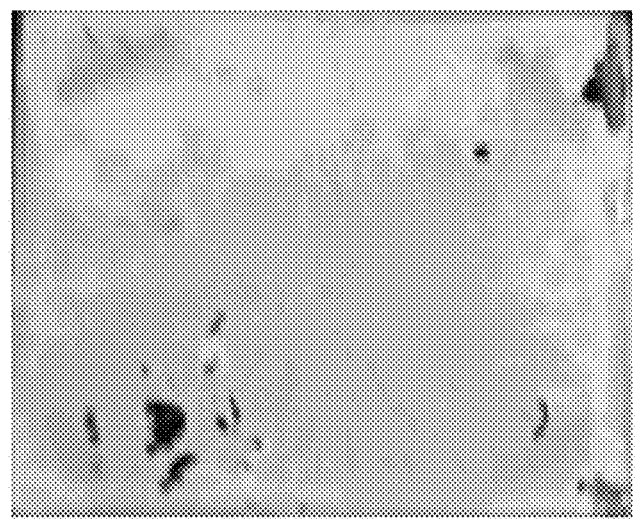
Figure 2C:
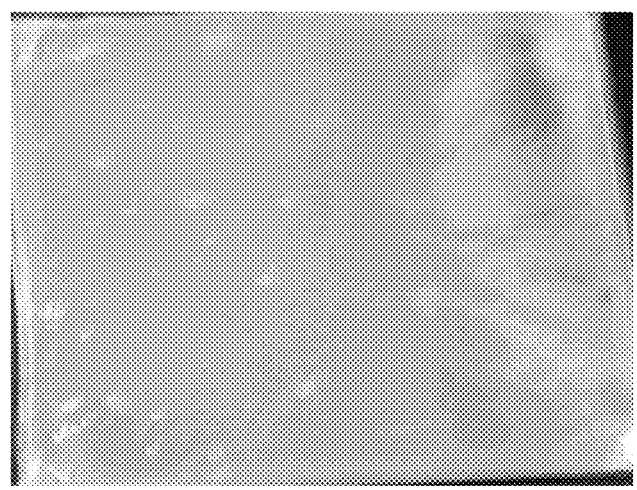
Figure 2D:
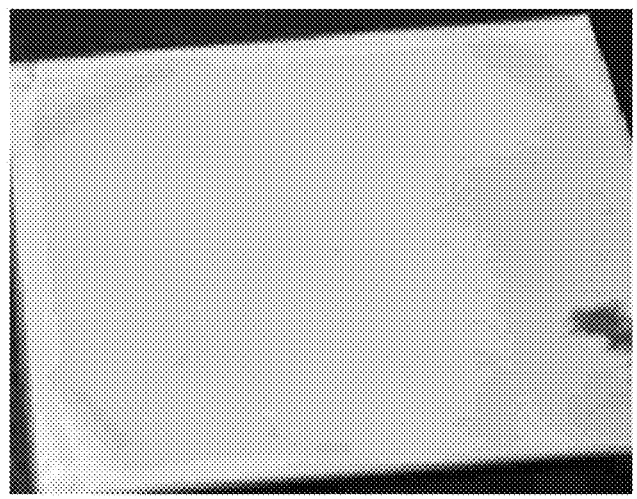

FIGS. 2A through 2D show pictures of a $TiO_2/SiO_2$ interlayered thin film manufactured such that the $TiO_2/SiO_2$ interlayered thin film is disposed immediately on a substrate 100 coated with silica balls as the nano particles 200 without the absorption layer 30 between the interlayered thin film and the substrate 100 to reflect blue (FIG. 2A), red (FIGS. 2B and 2C), and yellow through green (FIG. 2D). As can be seen from FIGS. 2A through 2D, due to scattering from the silica balls and reflection from the substrate 100, the pictures look white as a whole, failing to implement colors because both $TiO_2$ and $SiO_2$ are transparent thin films having no absorption capability.

Figure 3A:
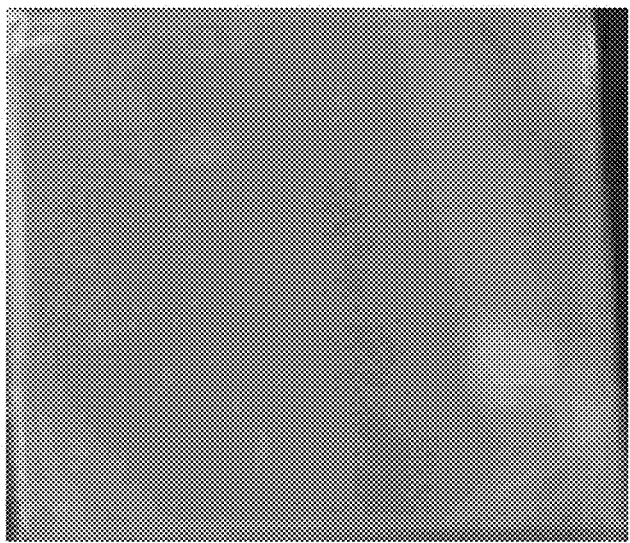
FIG. 3A shows a structure resulting from depositing a thin chrome (Cr) film as an absorption layer on a silica-ball-coated substrate prior to depositing a $TiO_2/SiO_2$ interlayered thin film.
Figure 3B:
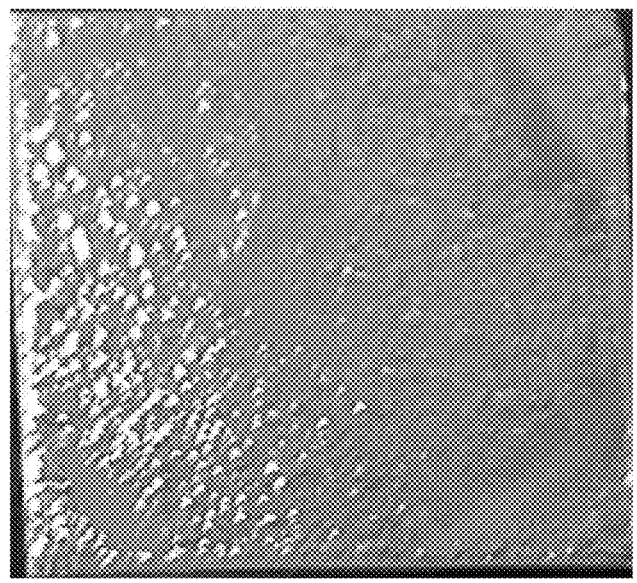
FIG. 3B shows a structure resulting from depositing a thin Cr film as an absorption layer on a silica-ball-coated substrate and depositing a $TiO_2/SiO_2$ interlayered thin film on the thin Cr film to reflect blue.

FIG. 3A shows a structure resulting from depositing a thin Cr film as the absorption layer 30 on the substrate 100 coated with the silica balls as the nano-particles 200 prior to depositing the $TiO_2/SiO_2$ interlayered thin film, and FIG. 3B shows a structure resulting from depositing a thin Cr film as the absorption layer 30 on the silica-ball-coated substrate 100 and depositing the $TiO_2/SiO_2$ interlayered thin film on the thin Cr film to reflect blue. Cr shows strong absorption capability in a visible light region, such that, for example, after deposition of a thin Cr film having a thickness of about 200 nm, the substrate 100 looks dark gray. Referring to FIG. 3B, after deposition of the $TiO_2/SiO_2$ interlayered thin film to reflect blue, the substrate 100 looks clear blue.

Figure 4:
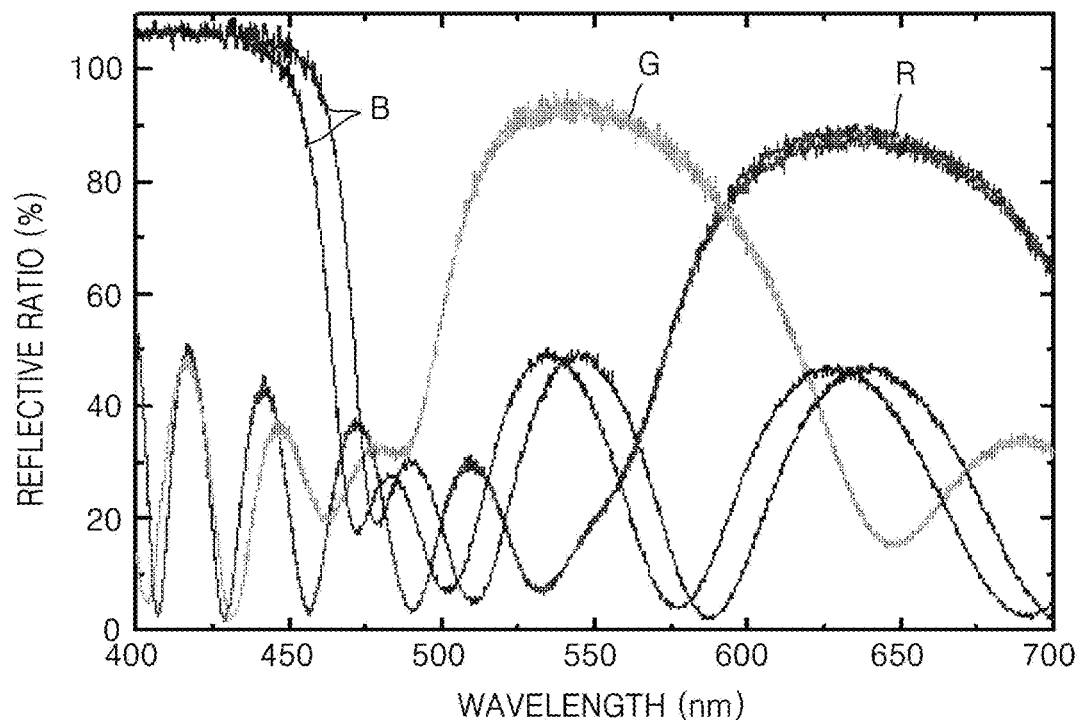
FIG. 4 is a graph showing reflection spectrums of a $TiO_2/SiO_2$ interlayered thin film provided to reflect blue, red, and green when about several hundreds of nms of Cr is deposited on a silicon substrate and 8 pairs of TiO$_2$/SiO$_2$ interlayered thin films are repetitively deposited on Cr.

FIG. 4 is a graph showing reflection spectrums of the $TiO_2/SiO_2$ interlayered thin film provided to reflect blue (B), red (R), and green (G) when of Cr is deposited on the silicon substrate 100 to have a thickness of about several hundreds nms and 8 pairs of $TiO_2/SiO_2$ are repetitively deposited on Cr layer. In FIG. 4, two lines indicating a blue reflection spectrum are related to two different samples. It can be seen from FIG. 4 that when a thin Cr film is formed as the absorption layer 30, increase in a reflection ratio based on metal reflection and color purity improvement by absorption can be achieved.

Referring back to FIG. 1, the substrate 100 may be a flexible or rigid substrate. The flexible substrate and the rigid substrate may be any those which are used in existing display apparatuses and semiconductor device processing. The substrate 100 may be transparent or opaque. The plurality of nano-particles 200 may have non-uniform sizes. The plurality of nano-particles 200 may form a monolayer, and in some cases, may form a plurality of layers. Some adjacent nano-particles among the plurality of nano-particles 200 may not contact each other. Materials of the plurality of nano-particles 200 may be, for example, silica balls of silicon oxide, polycrystal silicon, and the like, but are not limited thereto and may be changed variously. A diameter of each of the plurality of nano-particles 200 may be about several tens of nm through about several hundreds of nm.

According to example embodiments, the absorption layer 30, which covers the plurality of nano-particles 200, is positioned on the substrate 100 and the reflective film 300 may be provided on the absorption layer 30. The surface of the reflective film 300 may have a "multi-concave-convex structure" where the plurality of micro-scale first concave-convex elements P1 and the plurality of nano-scale second concave-convex elements P2 are formed. The reflective film 300 may have a multi-layer structure where the first layer 10 and the second layer 20 are repetitively stacked in turns. Herein, the size of each of the plurality of second concave-convex elements P2 may be similar to that of each of the plurality of nano-particles 200. While the second concave-convex element P2 has been shown only in a partial enlargement in FIG. 1 for convenience sake the nano-particle 200 has been shown as large sizes, the size of the second concave-convex element P2 and the size of the nano-particle 200 may be similar to each other as about several tens of nm through about several hundreds of nm.

A transparent flexible material layer 400 may be further provided on the reflective film 300. The transparent flexible material layer 400 may be, for example, a polymer layer, or may be another-material layer. When the substrate 100 is a flexible substrate, the reflective structure shown in FIG. 1 may be flexible as a whole. Such a flexible reflective structure may be applied as a component of a flexible display apparatus.

In addition, the reflective structure according to example embodiments may have a plurality of reflective films expressing different colors on a single substrate. For example, if first through third reflective films are formed on different regions of a substrate to have different thicknesses and/or materials, they may reflect different colors, e.g., red, green, and blue.

Hereinafter, a manufacturing method of a reflective structure, according to example embodiments will be described with reference to FIG. 1. A manufacturing method of a reflective structure, according to other embodiments of the present disclosure, to be described below may be derived from the manufacturing method described in the current embodiment, and thus the manufacturing method will use FIG. 1 as an example for description.

FIGS. 5A through 5H are diagrams for describing a manufacturing method of a reflective structure, according to example embodiments.

Figure 5A:
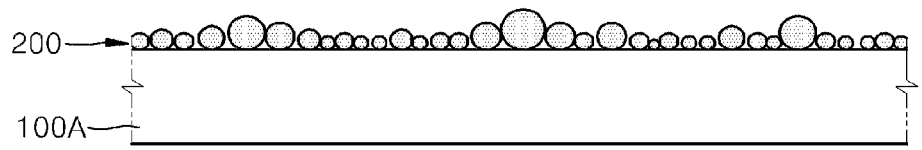
FIGS. 5A through 5H illustrate a manufacturing method of a reflective structure, according to example embodiments.

Referring to FIG. 5A, the plurality of nano-particles 200 having non-uniform sizes may be coated onto a first substrate 100A. The first substrate 100A may be a rigid substrate. The first substrate 100A may be a substrate used in display apparatuses or semiconductor device processing. For example, a material of the first substrate 100A may be a semiconductor such as silicon or an insulator such as silicon oxide. The material of the first substrate 100A may also be a conductor such as a metal or a metal oxide. The plurality of nano-particles 200 may be formed by, for example, spin coating, or other methods. Materials of the plurality of nano-particles 200 may be, for example, silica balls such as silicon oxide, polycrystal silicon, or the like, and may be others variously. The diameter of each of the plurality of nano-particles 200 may be about several tens of nm through about several hundreds of nm. At least some of the plurality of nano-particles 200 may be formed to have an interval of about several nms through about several tens of nm between adjacent nano-particles. The density of the nano-particles 200 may be intentionally adjusted such that they are not excessively compact.

Also in this case, however, some of the plurality of nano-particles 200 may contact each other.

Even when thermal processing is not performed, the plurality of nano-particles 200 may be weakly adhered to the first substrate 100A. Thus, subsequent processing may be performed without separate thermal processing. However, when necessary, thermal processing may be performed to improve adhesive strength of the plurality of nano-particles 200 to the first substrate 100A. According to thermal temperature and time, the adhesive strength may be adjusted. When the nano-particles 200 are weakly adhered to the first substrate 100A, the nano-particles 200 may be easily separated from the first substrate 100A. However, when it is not necessary to separate the nano-particles 200 from the first substrate 100A in subsequent processing, the nano-particles 200 may be firmly adhered to the first substrate 100A through thermal processing in this stage. When thermal processing is necessary, the first substrate 100A may be a rigid substrate to endure a temperature of thermal processing.

Figure 5B:
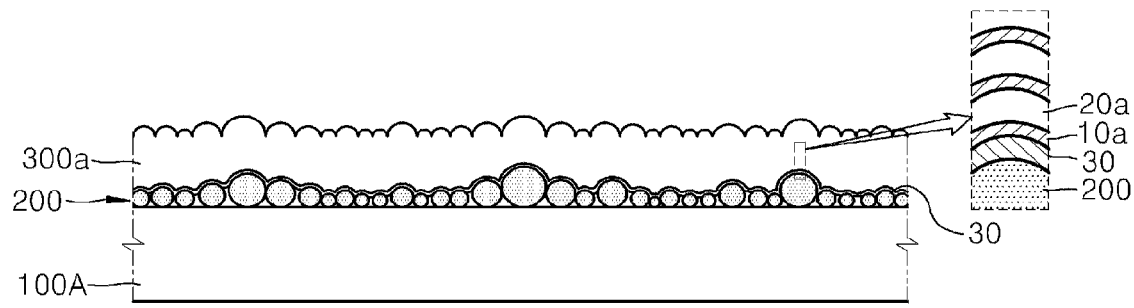

Referring to FIG. 5B, the absorption layer 30 is formed on the plurality of nano-particles 200 and a reflective film 300a may be formed on the absorption layer 30. The absorption layer 30 and the reflective film 300a may be conformally formed along a shape formed by the plurality of nano-particles 200, such that they may have random heights. The reflective film 300a may have a structure where a first layer 10a and a second layer 20a are repetitively stacked. To form the first layer 10a and the second layer 20a, a processing temperature of about several hundreds of ° C. may be required. In this case, the first substrate 100A may be a rigid substrate capable of enduring the processing temperature.

Figure 5C:
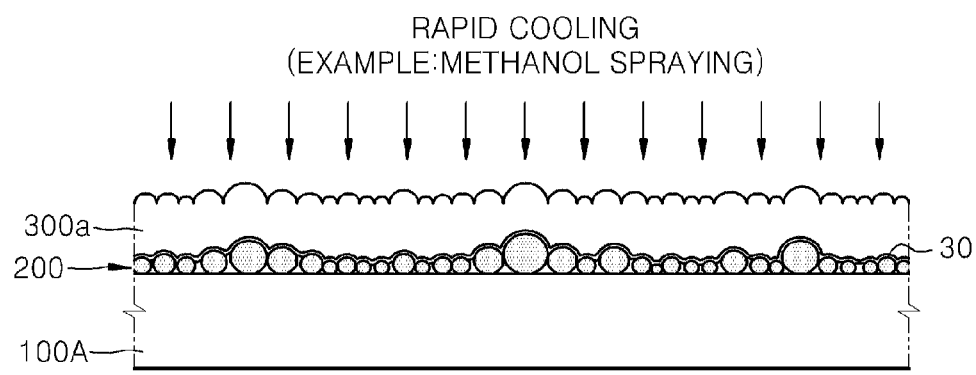

Next, as shown in FIG. 5C, the reflective film 300a may be rapidly cooled. The rapid cooling may be performed by, for example, spraying a volatile liquid to the reflective film 300a. The volatile liquid may be methanol, ethanol, acetone, or the like, and may use various volatile liquids without being limited thereto. A surface morphology of the reflective film 300a may be deformed by the rapid cooling, as shown in FIG. 5D.

Figure 5D:
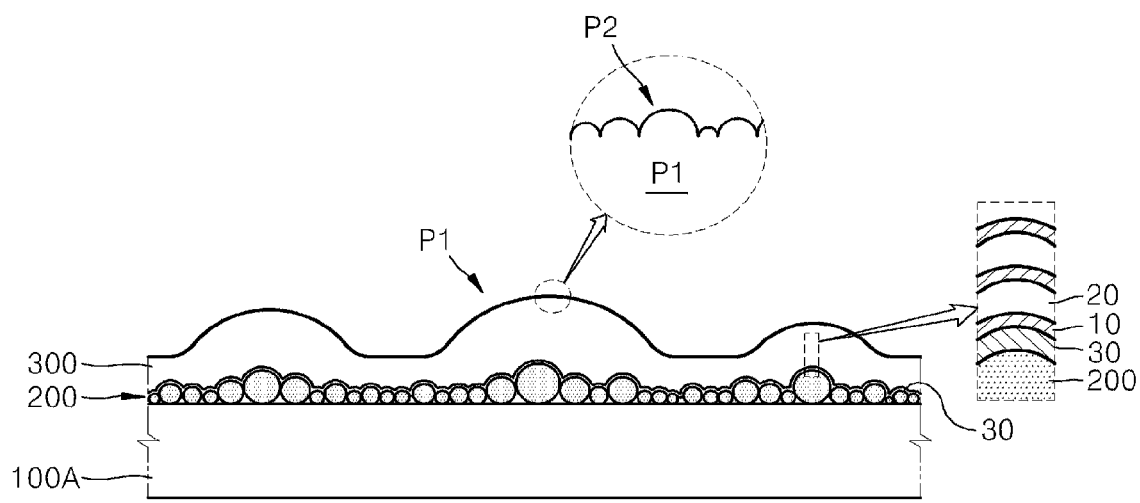

Referring to FIG. 5D, reference numeral 300 indicates a rapidly cooled reflective film (hereinafter, will be referred to as a reflective film). As stated previously with reference to FIG. 1, the reflective film 300 may have a multi-concave-convex structure where the plurality of micro-scale first concave-convex elements P1 and the plurality of nano-scale second concave-convex elements P2 are formed. Herein, the plurality of second concave-convex elements P2 may be substantially the same as concaves and convexes of the reflective film 300a shown in FIG. 5B. In other words, the concaves and the convexes formed on the surface of the reflective film 300a shown in FIG. 5B may remain almost intact and concaves and convexes having a larger scale (first concave-convex elements P1) may be formed by the rapid cooling. Although the second concave-convex element P2 is shown only in a partial enlargement for convenience sake, the plurality of second concave-convex elements P2 exist over the entire top surface of the reflective film 300 and may have a size similar to each nano-particles 200. The rapid cooling may affect the plurality of nano-particles 200. For example, a group of adjacent nano-particles among the plurality of nano-particles 200 may be adhered to each other by the rapid cooling. Such adherence between the adjacent nano-particles may occur in several spots. Simultaneously with adherence between the adjacent nano-particles, the surface of the reflective film (300a shown in FIG. 5C) is dented, such that the reflective film 300, as shown in FIG. 5D, may be obtained. However, the foregoing method/mechanism is merely illustrative. Therefore, the reflective film 300a shown in FIG. 5B may be deformed into the reflective film 300 shown in FIG. 5D through methods other than "rapid cooling".

Figure 5E:
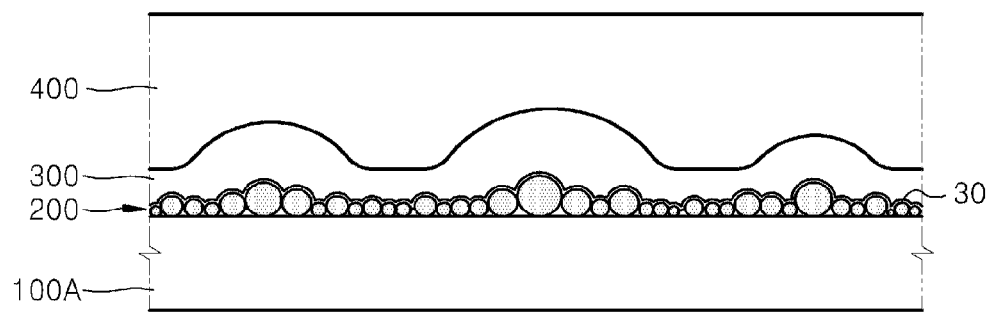

Referring to FIG. 5E, the flexible material layer 400 may be formed on the reflective film 300. The flexible material layer 400 may be transparent. For example, the flexible material layer 400 may be a transparent polymer layer. The transparent polymer layer includes polydiemthylsiloxane (PDMS), poly (methyl methacrylate) (PMMA), polycarbonate (PC) etc. but can include any transparent materials other than polymers. When necessary, a hardening processing may be performed with respect to the flexible material layer 400. The flexible material layer 400 may have an adhesive property with the reflective film 300, but may not do so. In the latter case, an adhesive layer (not shown) may be further provided between the reflective film 300 and the flexible material layer 400.

Figure 5F:
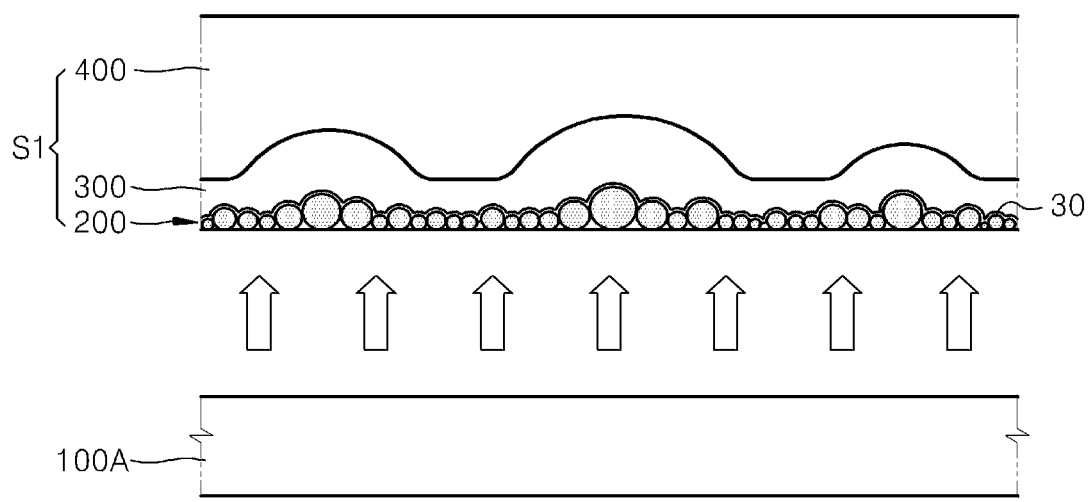

Referring to FIG. 5F, a stacked structure S1, including the plurality of nano-particles 200, the absorption layer 30, the reflective film 300, and the flexible material layer 400, may be separated from the first substrate 100A. The plurality of nano-particles 200 may be weakly adhered to the first substrate 100A in a stage shown in FIG. 5A, and the adhesive strength of the plurality of nano-particles 200 with respect to the first substrate 100A may be weakened in stages shown in FIGS. 5C and 5D. Therefore, the stacked structure S1 may be easily separated from the first substrate 100A in the current stage shown in FIG. 5F.

Figure 5G:
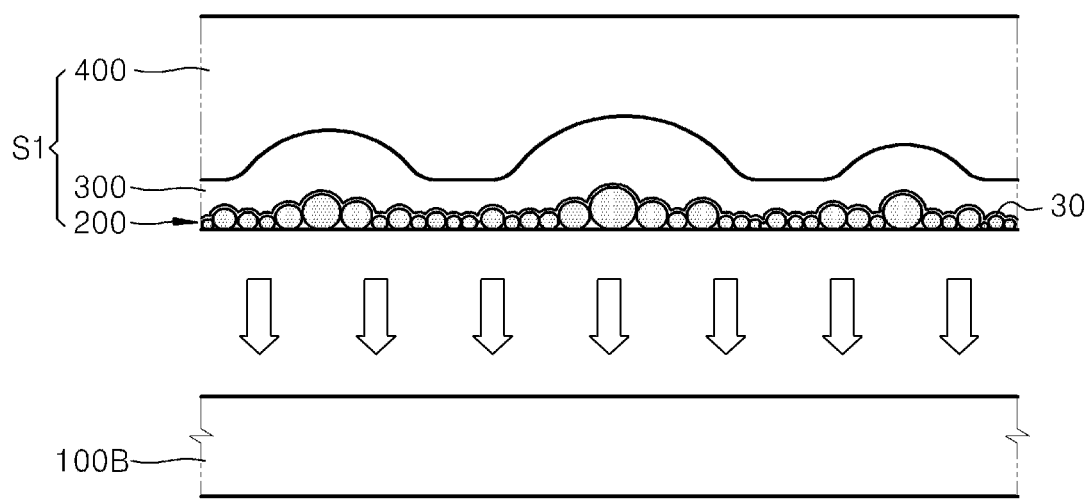
Figure 5H:
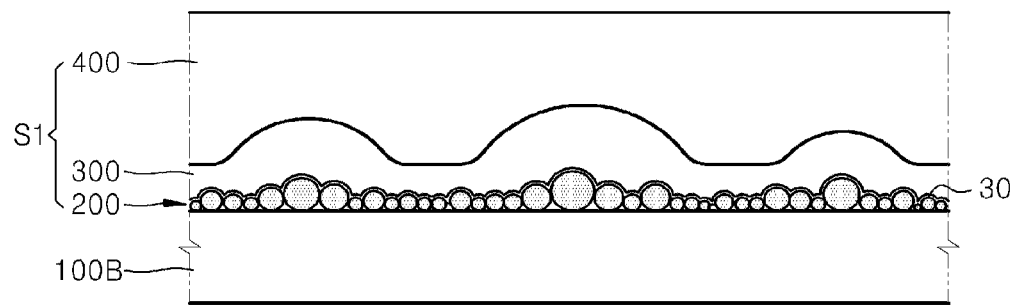

Referring to FIGS. 5G and 5H, the stacked structure S1, including the plurality of nano-particles 200, the absorption layer 30, the reflective film 300, and the flexible material layer 400, may be adhered to a second substrate 100B. By forming an adhesive layer (or adhesive, not shown) on at least one of a bottom surface of the stacked structure S1 and a top surface of the second substrate 100B, the second substrate 100B and the stacked structure S1 may be adhered to each other with the adhesive layer (or adhesive) as a medium. However, the stacked structure S1 may be fixed to the second substrate 100B using a member other than the adhesive layer (or adhesive). The second substrate 100B may be a flexible substrate. When the second substrate 100B is a flexible substrate, a flexible reflective structure can be manufactured. However, the second substrate 100B may also be a rigid substrate. The flexible substrate and the rigid substrate may be any those which are used in existing display apparatuses and semiconductor device processing.

Although not shown in the drawings, a plurality of stacked structures S1 may be adhered to a single large-area substrate. In this case, the plurality of stacked structures S1 may include three types of stacked structures which reflect red, green, and blue, respectively. According to this method, a reflective structure with a large area and a display apparatus employing the reflective structure can be easily manufactured.

In the above-described manufacturing method, only stages shown in FIGS. 5A through 5D may be performed without performing subsequent stages. In this case, the reflective film 300 may be firmly adhered to the first substrate 100A in the stage shown in FIG. 5A, and the reflective film 300 formed on the first substrate 100A, after the stage shown in FIG. 5D, may be used as a reflective structure.

While it has been described that the absorption layer 30 is provided as the color purity control element between the plurality of nano-particles 200 and the reflective film 300, the reflective structure according to example embodiments may also include various color purity control elements.

Figure 6:
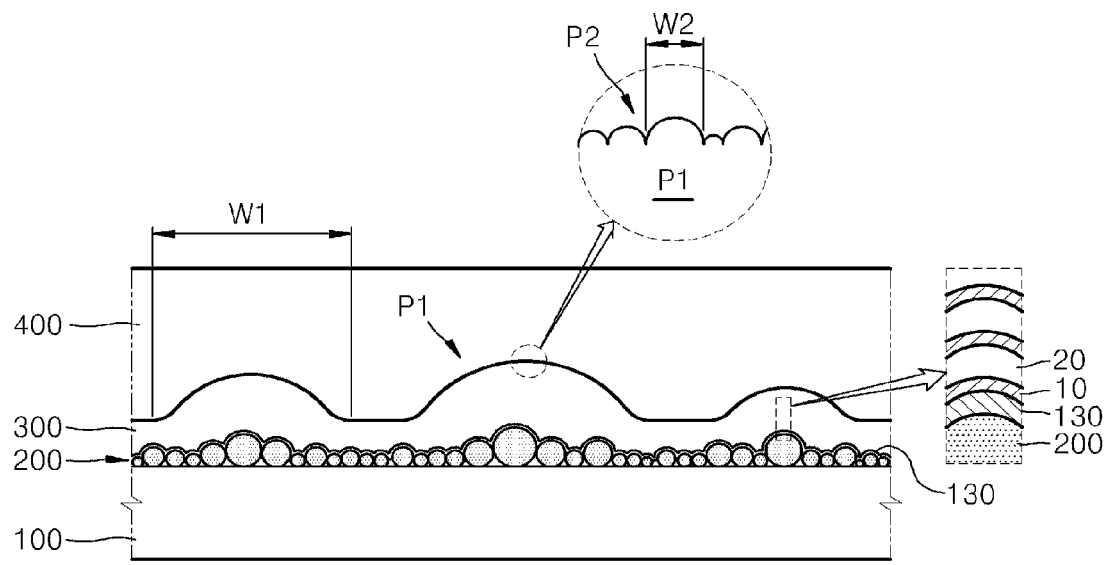
FIGS. 6 through 9 are schematic diagrams of a reflective structure according to example embodiments.

For example, the color purity control element may be a reflective layer 130 provided between the plurality of nano-particles 200 and the reflective film 300, that is, on the bottom surface of the reflective film 300, as shown in FIG. 6. The reflective layer 130 may be formed to include aluminum or barium sulfate as a material for increasing brightness through reflection. When the reflective layer 130 is formed as a metal layer, the metal layer may provide a weak reflected light with respect to the overall visible light region in addition to a absorption function, thereby improving luminance while maintaining a high color-specific reflection ratio of a structure color obtained by the reflective film 300.

Figure 7:
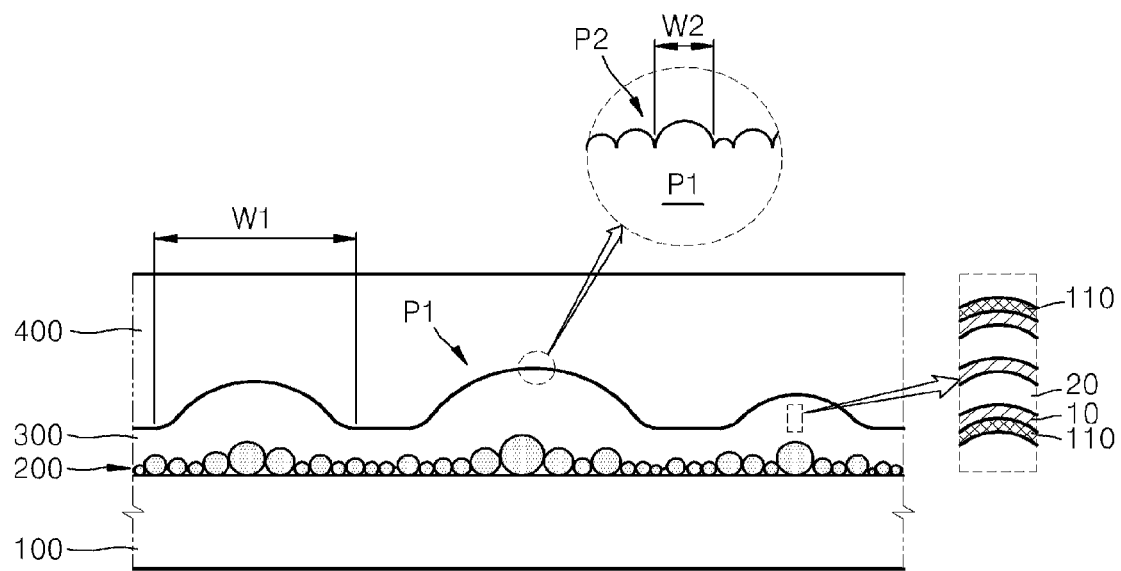
Figure 8:
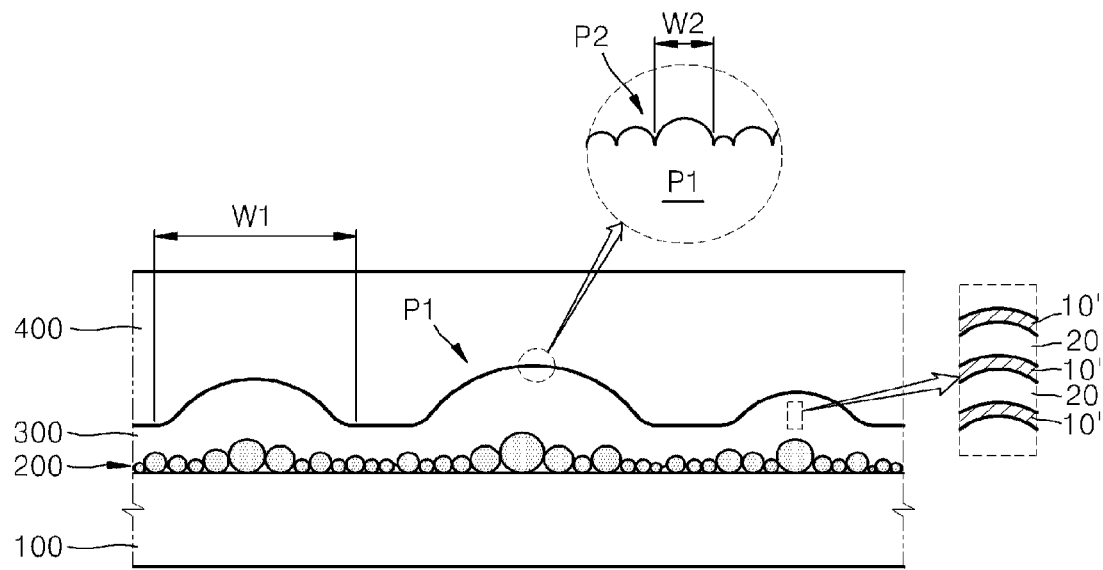

As another example, the color purity control element may be the complementary-color absorption layer 110 formed of at least one layer in the reflective film 300, as shown in FIGS. 7 and 8. In FIG. 7, in addition to the first layer 10 and the second layer 20, which form an interlayered thin film in the reflective film 300, a complementary-color absorption layer 110 is further provided. The complementary-color absorption layer 110 may be formed of a material capable of absorbing a complementary color with respect to a reflected color of the reflective film 300. For example, the complementary-color absorption layer 110 may be formed of Si capable of absorbing blue color light. In FIG. 8, one of the first layer 10 and the second layer 20 which form a interlayered thin film, for example, the first layer 10, is formed as a complementary-color absorption layer 10' in the reflective film 300. That is, in FIG. 8, the reflective film 300 may have a structure where the complementary-color absorption layer 10' and the second layer 20, which is a transparent layer formed of a material having a different refractive index, may be formed in turns. The transparent second layer 20 may be formed to have a thickness suitable for determining a reflected color of the reflective film 300, and the complementary-color absorption layer 10' may be formed of a material capable of absorbing a complementary color with respect to the reflected color. For example, the reflective film 300 may include a $SiO_2$/Si interlayered thin film by forming an silicon oxide layer $SiO_2$ which is the second layer 20 and a silicon layer in turns, in which the silicon layer is the complementary-color absorption layer 10'. Since the silicon oxide layer $SiO_2$ is a transparent layer, the reflected color of the reflective film 300 is determined by the thickness of the silicon oxide layer $SiO_2$. The Si layer itself strongly absorbs light in blue, which is a complementary color with respect to yellow and orange colors. Therefore, by forming the reflective film 300 as the $SiO_2$/Si interlayered thin film, a reflective film which reflects approximately red may be obtained.

Figure 9:
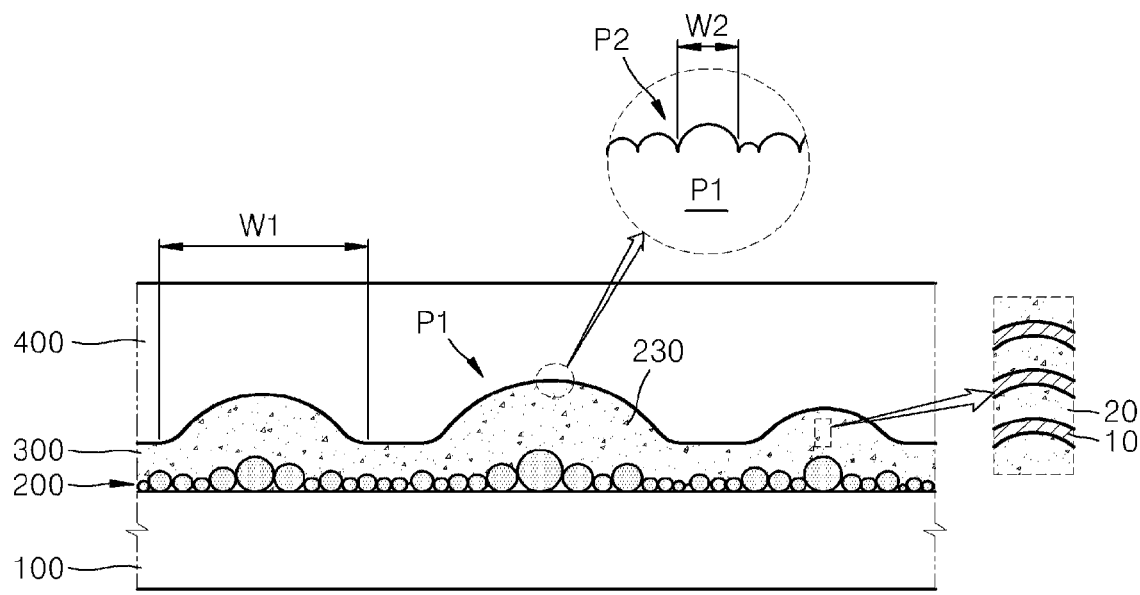

In example embodiments, a color purity control element 230 may be distributed in the reflective film 300, as shown in FIG. 9. The distributed color purity control element 230 may include a pigment or a dye capable of absorbing a complementary color with respect to the reflected color of the reflective film 300.

The reflective structure according to example embodiments may be applicable to various display apparatuses. For example, the foregoing reflective structure can be applied to not only a dynamic device such as a polymer dispersed liquid crystal (PDLC) display apparatus or a liquid crystal display (LCD) or a static information transferring medium such as signboards, but also pigment or cosmetic products. For example, the reflective structure according to example embodiments can be used in place of a color filter of a PDLC display apparatus or an LCD. A conventional absorptive color filter has a low transmission efficiency and a low chromaticity, but by using the reflective structure according to example embodiments, high-efficiency and high-chromaticity colors can be implemented. In the case of application to pigment or cosmetic products, the reflective structure may be cut into small pieces to be mixed in the paint or cosmetic product. By doing so, colors that cannot be achieved by some general pigments or dyes can be implemented.

Figure 10:
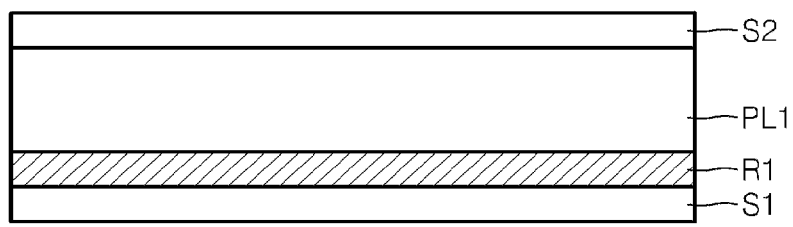
FIG. 10 shows a polymer-dispersed liquid crystal (PDLC) display apparatus including a reflective structure according to example embodiments.

FIG. 10 shows a PDLC display apparatus including a reflective structure according to example embodiments.

Referring to FIG. 10, a high-polymer dispersed liquid crystal layer (hereinafter, will be referred to as a liquid crystal layer) PL1 may be provided between a lower substrate S1 and an upper substrate S2. A color reflector R1 may be provided between the lower substrate S1 and the liquid crystal layer PL1. The color reflector R1 may be provided under the lower substrate S1 instead of between the lower substrate S1 and the liquid crystal layer PL1. The color reflector R1 may be the reflective structure according to example embodiments. Although not shown in detail, the color reflector R1 may include a red reflection region, a green reflection region, and a blue reflection region. Once first through third reflective films are formed to different thicknesses and/or of different materials in different regions of a substrate, they reflect different colors. Therefore, the first through third reflective films may correspond to the red reflection region, the green reflection region, and the blue reflection region, respectively. The PDLC display apparatus shown in FIG. 10 may be a flexible display apparatus, but may not be so.

The reflective structure according to example embodiments may be applied to various display apparatuses, as well as a PDLC display apparatus shown in FIG. 10.

While some example embodiments have been particularly shown and described, it will be understood by one of ordinary skill in the art that variations in form and detail may be made therein without departing from the spirit and scope of the claims.

What is claimed is:

1. A reflective structure comprising:
a reflective film configured to reflect, diffract, and diffuse incident light omni-directionally, the reflective film including,
a plurality of first concave-convex elements having a curved surface, and
a plurality of second concave-convex elements on the curved surface, the second concave-convex elements being a smaller scale than a scale of the first concave-convex elements, and
the reflective film including a plurality of first layers and a plurality of second layers alternately stacked in turns; and
a color purity control element configured to substantially reduce degradation of a color purity expressed by the reflective film, the color purity control element including a pair of complementary-color absorption layers made of different material from both the first layers and the second layers, the pair of complementary-color absorption layers directly on the first layers at opposite surfaces of the first layers and the second layers alternately stacked, respectively, the pair of complementary-color absorption layers configured to absorb a complementary light with respect to a color light reflected by the reflective film.

2. The reflective structure of claim 1, further comprising:
a plurality of nano-particles, and
the reflective film is on the plurality of nano-particles.

3. The reflective structure of claim 1, wherein a thickness of each of the second layers corresponds to $\lambda/2$, where $\lambda$ is a center wavelength of the color light reflected by the reflective film, and the second layers have a different refractive index from silicon.

4. The reflective structure of claim 3, wherein the second layers are silicon oxide.

5. A display apparatus comprising a reflective structure that includes:
- a reflective film configured to reflect, diffract, and diffuse incident light omni-directionally, the reflective film including,
- a plurality of first concave-convex elements having a curved surface, and
- a plurality of second concave-convex elements on the curved surface, the second concave-convex elements being a smaller scale than a scale of the first concave-convex elements, and
- the reflective film including a plurality of first layers and a plurality of second layers alternately stacked in turns; and
- a color purity control element configured to substantially reduce degradation of a color purity expressed by the reflective film, the color purity control element including a pair of complementary-color absorption layers made of different material from both the first layers and the second layers, the pair of complementary-color absorption layers directly on the first layers at opposite surfaces of the first layers and the second layers alternately stacked, respectively, the pair of complementary-color absorption layers configured to absorb a complementary light with respect to a color light reflected by the reflective film.

6. The display apparatus of claim 5, further comprising:
a plurality of nano-particles, and
the reflective film is on the plurality of nano-particles.

* * * * *